United States Patent [19]

Jumper

[11] Patent Number: 5,666,518
[45] Date of Patent: Sep. 9, 1997

[54] PATTERN RECOGNITION BY SIMULATED NEURAL-LIKE NETWORKS

[75] Inventor: Eric J. Jumper, Granger, Ind.

[73] Assignee: The United States of America as represented by the Secretary of the Air Force, Washington, D.C.

[21] Appl. No.: 494,866

[22] Filed: Jun. 26, 1995

[51] Int. Cl.⁶ .................................................. G06F 15/18
[52] U.S. Cl. ............................... 395/500; 395/21; 395/23; 364/148; 364/578; 364/164; 364/581; 364/819; 370/255
[58] Field of Search ............................ 395/500, 21, 23; 364/513, 148, 824, 578, 164, 819, 820; 370/255, 517; 375/286, 299, 343

[56] References Cited

U.S. PATENT DOCUMENTS 4,937,872  6/1990  Hopfield et al. .......................... 381/43
4,947,482  8/1990  Brown ....................................... 364/807
5,446,829  8/1995  Wang et al. ............................... 395/24

OTHER PUBLICATIONS

Jumper, Jr., "A Multi Temporal Trainable Delay Neural Network", IEEE, Jun. 27, 1994, pp. 441–446.
Colnet et al., "Bearing Estimation with Time Delay Neural Networks", IEEE, 1995, pp. 3583–3586.

Primary Examiner—Kevin J. Teska
Assistant Examiner—Thai Phan
Attorney, Agent, or Firm—William G. Auton; Harold L. Burstyn

[57] ABSTRACT

Apparatus and method for replacing the traditional amplifications by rime delays in a neural network that can be trained to analyze temporally-related patterns. Time delays comprise the synapses between feeder and stimulus cells in the network. The result is a multi-temporal trainable delay neural network.

20 Claims, 7 Drawing Sheets

FIG. 6A $$s_{ij}(t) = \alpha_i e^{-\lambda_{ij}^2/\gamma_i},$$

(1)

where $\lambda_{ij} = t - (t_i + \Delta_{ij})$.

$$s_{ij}(t) = \alpha_i X(\lambda_{ij}) e^{-\lambda_{ij}^2/\gamma_i}$$

(1a)

where $$X(\lambda_{ij}) = \begin{cases} 0 & \text{for } \lambda_{ij} \leq -\phi_i, \\ \left(1 + \frac{1}{\phi_i}\lambda_{ij}\right) & \text{for } -\phi_i \leq \lambda_{ij} \leq 0, \\ \left(1 - \frac{1}{\phi_i}\lambda_{ij}\right) & \text{for } 0 \leq \lambda_{ij} \leq \phi_i, \\ 0 & \text{for } \lambda_{ij} \geq \phi_i, \end{cases}$$

and $\lambda_{ij} = t - (t_i + \Delta_{ij})$.

$$\bar{s}_{ij}(t) = \sum_{m=1}^{f_i} s_{i_m j}(t)$$

(2)

$$S_j(t) = \sum_{i=1}^{n} \bar{s}_{ij}(t)$$

(3)

FIG. 6B $$t_j = \frac{\int_{t_+}^{t_-} t(S_j(t) - \Theta_j)dt}{\int_{t_+}^{t_-} (S_j(t) - \Theta_j)dt} \quad . \quad (5)$$

$$\alpha_j = \frac{\int_{t_+}^{t_-} (S(t)_j - \Theta_j)dt}{\int_{-\phi_j}^{\phi_j} X(t)e^{-t^2/\gamma_j}dt} \quad . \quad (6)$$

$$o_j(t) = \alpha_j X(t - t_j)e^{-(t-t_j)^2/\gamma_j} \quad . \quad (6a)$$

$$s_{jk}(t) = o_j(t - \Delta_{jk}) = \alpha_j X(\lambda_{jk})e^{-\lambda_{jk}^2/\gamma_j} \quad ,$$
$$(6b)$$

where $\lambda_{jk} = t - (t_j + \Delta_{jk})$.

$$\Delta_{ij}^{new} = \Delta_{ij}^{old} - \delta\Delta_{ij} \quad . \quad (7a)$$

$$\Delta_{ij}^{new} = \Delta_{ij}^{old} - \delta\Delta_{ij} \text{, where } \delta\Delta_{ij} < \Delta_{ij}^{old}. \quad (7b)$$

FIG. 6C $$\delta\Delta_{ij} = f(\lambda_{ij}), \text{ where } \delta\Delta_{ij} < \lambda_{ij}, \quad (8)$$

$$\delta\Delta_{ij} = \rho_j \lambda_{ij}, \quad \text{where } 0 \leq \rho_j \leq 1.0. \quad (9)$$

$$\delta\Theta_j = \omega_j(\Omega_j \max(S_j(t)) - \Theta_j). \quad (10)$$

$$\Theta_j^{new} = \Theta_j^{old} + \delta\Theta_j. \quad (11)$$

PATTERN RECOGNITION BY SIMULATED NEURAL-LIKE NETWORKS

STATEMENT OF GOVERNMENT INTEREST

The invention described herein may be manufactured and used by or for the Government for governmental purposes without the payment of any royalty thereon.

BACKGROUND

This invention relates to the analysis of temporally related patterns by neural-like networks, and more particularly to pattern recognition by simulated adaptation of neural-like synapses based on temporal stimuli.

Prior neural-like networks have encoded temporal data for input to static networks, or employed back-propagation through time, avalanche filters, recursive networks and temporal difference learning.

In prior attempts to learn temporal relationships, use has been made of varying amplification weights, coupled with a constant periodic sampling of input signals. For temporal pattern recognition, the most common approach has been to adapt neural-like networks to handle the temporal aspects of problems by the use of sampled time windows, delayed feedback loops and other common approaches for dealing with temporal relationships. All of these approaches enable an engineer to use common weighting and adaptive techniques for the analysis of temporal events or signals.

It is an object of this invention is to avoid current neural network techniques and do better than to simply implement developed algorithms. A related object is to avoid the use of encoded temporal data for input to static networks, or the employment of back-propagation through time, avalanche filters, recursive networks and temporal difference learning.

Still another object of the invention is to avoid use of varying amplification weights, coupled with a constant periodic sampling of input signals.

A further object of the invention for temporal pattern recognition is to avoid adapting neural-like networks to handle the temporal aspects by sampled time windows, delayed feedback loops and other related approaches. A related object is to avoid use of common weighting and adaptive techniques for the analysis of temporal events or signals.

Although the input-output response of the common perceptron, i.e., artificial neuron, is commonly modeled after biological neural activity, its behavior leaves behind any temporal aspects of signals between neurons, which transmit and receive pulses. The nonlinear function of the artificial neuron, whether it has a sigmoid or some other type of function, is selected to model the reaction of a biological neuron to the frequency of pulse occurrences. It may be considered to be a frequency transfer function from an input frequency to an output frequency. The input and output of such a neuron, because of the selection of pulse occurrence functionality, becomes a numerical signal, rather than a temporal signal.

The simple perceptron is not adapted to analyze temporal relationships between pulses. It uses frequency as an input in order to analyze signal magnitudes. For temporal processing by a network of perceptrons, other means of encoding for the effects of time must be applied.

Accordingly, another object of the invention is to provide perceptron input-output that takes into account the temporal aspects of signals between neurons, which transmit and receive pulses. A related object is to avoid modeling the reaction of a biological neuron to the frequency of pulse occurrences. Still another related object is to avoid a frequency transfer function from an input frequency to an output frequency. Another related object is to avoid the selection of pulse occurrence functionality, as a numerical signal, rather than a temporal signal.

Still another object is to avoid the simple perception which uses frequency as an input in order to analyze signal magnitudes and is not adapted to analyze temporal relationships between pulses.

Yet another object of the invention is to achieve temporal processing by a network of perceptrons which can encode for the effects of time.

Further background is provided by Durbin, Miall & Mitchison in *The Computing Neuron*, Addison-Wesley Publishers Ltd. 1989; Amit in *Modeling Brain Function*, Cambridge University Press. 1989; and Jumper, "Cellular Neural Structures: A Theory In Distributed Neural Learning Within A Neural Network", Proceedings IEEE Dual-Use Technologies & applications Conference, 1993, SUNY Instute of Technology at Utica/Rome.

SUMMARY OF THE INVENTION

The present method uses delays, rather than amplifications, to encode temporal relationships directly into a simulated neural network. This method improves memory usage by the network during simulation, and reduces the required size of the neural simulation network for analysis, such as of temporal pattern recognition.

The invention presents a simple method of using delays between cells, rather than the typical amplification weight procedure. The delays vary throughout the network. The method adapts neural synapse delays based on a temporal stimulus. Neural simulation networks using this method can be regarded as "Multi-Temporal, with Trainable Delays". An architecture and procedure are provided for classifying temporal patterns.

Where there are large data bases, such as those involved in aircraft spotting, the neural simulation network method of the invention allows the recognition of events leading up to the possible launch of an attack. The method allows the recognition of patterns that presently are constructed manually. A model is provided that takes historical data clusters and makes new determinations to avoid the need for painstaking analysis.

The method of the invention provides for simulating the responses of neural-like synapses by (a) initializing a network of simulated neurons containing variable time delays and fire-time memories by setting all delays to unity and clearing all neuron fire time memories; (b) inputting temporal stimuli by setting the fire-time memories of input neurons to the times they will next fire; (c) initializing time as the earliest pulse time minus a prescribed pulse time width; (d) normalizing the network by normalizing sets of delays for each neuron; (e) initializing indexes and sums for the feeder and stimulus cells; (f) setting a summation of feeder pulses plus a stimulus from a prescribed pulse; and (g) determining if the prescribed pulse has arrived at a stimulus neuron.

In accordance with a further aspect of the method the fire-time memories of input neurons are set to the times they will next fire due to the input stimulus of a next training data point, and time (t) is initialized as the earliest pulse time minus the prescribed pulse time width. Indexes and sums are initiated as stimulus pulse j=0, summation $S_j(t)=0$, feeder pulse i=0, $S_i(t)=0$, and the prescribed pulse C=0 for indexing through pulses from feeder pulse i. Summation $S_i(t)$ is set $=S_i(t)$+stimulus from pulse C. If the prescribed pulse has arrived at a stimulus neuron, delays are adapted for the stimulus neuron, but if the prescribed pulse has not arrived at the stimulus neuron, the next steps are incrementing prescribed pulse C=C+1, i=i+1 and j=j+1, and setting $C=PC_i$, $i=n_j$ and $j=m$; determine and update fire times; determine if there are still pending synapses, and if so, augment time t=t+D(elta)t and return to step (d), above.

In accordance with another aspect of the method if C does not equal the total number of pulses from the ith neuron, return to step (f), above, and if C equals the total number of pulses from the ith neuron, augment i to i=1. If $i=n_j$ is false then go to $S_i(t)=0$ in step (e), above. However, if $i=n_j$, augment j to j+1 and then if j=m, determine and update fire times. If there are still pending synapses, augment t=t+Dt and go to step (d), above. If there are no pending synapses, adapt thresholds and clear all neuron fire time memories and go to the input temporal stimulus step (b), above.

A neural simulation network of the invention includes a basic or stimulus cell which receives inputs from feeder cells; a plurality of synapses simulated by delay lines connected to the basic cell, with each synapse representing the position at which a nerve impulse from a feeder neuron is transmitted to stimulate the basic stimulus cell; and provision in the basic cell for summing the outputs of the delay lines. The input pulses are selected for their spreading characteristics, as well as ease of generation and manipulation. They are specified in terms of their amplitudes and temporal distances between pulse peaks and the center of the basic cell.

In accordance with another aspect of the neural simulation network, structure is provided for initializing a network of simulated neurons containing variable time delays and fire-time memories and setting all delays to unity while clearing all neuron fire time memories. Provision is also made for inputting temporal stimuli by setting the fire-time memories of input neurons to the times they will next fire and initializing time as the earliest pulse time minus a prescribed pulse time width. The network is normalized by normalizing sets of delays for each neuron; indexes and sum are initialized for feeder and stimulus cells. A summation is made of feeder pulses plus a stimulus from a prescribed pulse; and a determination has been made if the prescribed pulse has arrived at a stimulus neuron.

In a neural simulation network of the invention a pulse travels from a feeder cell i to a basic or stimulus cell j, with the pulse leaving cell i at a time $t_i$ and arriving at time $t_i+D(elta)_{ij}$ at cell j from a synapse. Provision is made for the arrival at the instant the peak stimulation generated by the pulse is sensed by the stimulus cell. Compensation is made for non-causal effects resulting from the stimulation of a synapse before a neuron cell fires, by modifying pulse shape or shifting the pulse.

In accordance with a further aspect of the neural simulation network, a feeder cell generates a plurality of pulses during processing of a single temporal pattern, and an aggregate stimulation generated by the feeder cell is a summation of the stimulation caused by all pulses generated by the feeder cell. The summation is thresholded and an output pulse is generated when the total stimulation is great enough to exceed the threshold. This can be from a voltage-controlled pulse generator which fires in response to a stimulus time centroid and a stimulus area amplitude. The thresholding is of an instantaneous stimulation given by the summation. The stimulus time centroid can be produced by an integrator whose output is reciprocated and multiplied by a time integral; and the stimulus area amplitude can be produced by an integrator whose output is multiplied by a constant voltage corresponding to the reciprocal of the area under a modified unit pulse.

In accordance with a further aspect of the method of the neural simulation network, the synapse delays between the cells can be adapted to attain learning and long term memory within the neural network by having delay lengths controlled by a stimulus cell neuron to which they input, with each synapse delay being updated when a pulse arrives at a stimulus cell from a feeder cell when the temporal distance for a pulse is zero, with each arrival causing an adjustment of other synapses so that the next time a temporal stimulus similar to the one which generated prior pulses appears on the synapses, the pulses will arrive closer together and the temporal distance and amplitude are smaller when the pulse arrives, representing a contraction which shortens in length effectively decreasing associated delays which are adjusted based on the temporal distances of pulses on pending synapses when a pulse arrives at a stimulus cell. This is subject to convergence by which a change in delay causes error in the delays to decrease and causality which requires that the delays be positive.

In accordance with a still further aspect of the neural simulation network, the value of the threshold is a percentage of the maximum stimulation felt by the stimulus cell and is adjusted a small amount toward a final threshold each time a neuron fires, so that a learning process is performed by individual cells in a multi-temporal trainable delay neural network.

The neural simulation network of the invention can have a plurality of layers, such as an input layer and an output layer, with one layer pulsed to generate an input to the network and the cells of another layer caused to adapt their synapse delays to acquire temporal patterns. For a simple temporal stimulus input for training the network, pulses are propagated through the network and a determination made of which other layer cells had the largest stimulation. The delays of those cells are adapted, and, for a complex stimulus, which stimulates a particular layer neuron more than once and may be broken into two or more simple stimuli, the network may have more than two layers, so that if the network trains on each simple stimulus pattern it will be able to classify them on an output layer, and if a complex stimulus is then presented to an input layer a less complex temporal sequence will result on an output layer, which may, in turn, be an input through synapses to a further layer and reduce the complexity of the temporal pattern.

DESCRIPTION OF THE DRAWINGS

Other aspects of the invention will become apparent after considering several illustrative embodiments, taken in conjunction with the drawings in which:

FIG. 6A is a set of equations (1) through (3) applicable to the network of FIGS. 1A and 1B;

FIG. 6B is a set of equations (5) through (7b) applicable to the network of FIG. 1B; and FIG. 6C is a further set of equations applicable to the invention.

DETAILED DESCRIPTION

I. Cell Interaction

Figures 1, 1A:
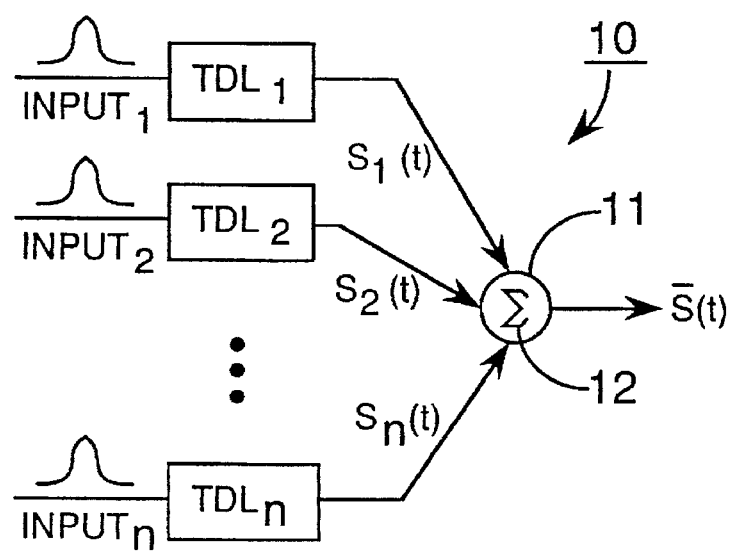
FIG. 1 is a key diagram showing the relationship between FIGS. 1A and 1B.
FIG. 1A is a schematic diagram of a basic or stimulus cell of a neural-like network in accordance with the invention.

With reference to the drawings, FIG. 1A illustrates a neural simulation network 10 of the invention with a basic cell 11 which receives inputs 1 through n from feeder cells (not shown) through a number of synapses simulated by tapped delay lines TDL1 through TDLn. FIG. 1A is to be considered in relation to FIG. 1B, as indicated in the key diagram of FIG. 1.

Each synapse simulated by a tapped delay line in FIG. 1A represents the position at which a nerve impulse from a feeder neuron, i.e., nerve cell, passes from an axon, or nerve fiber core, to a dendrite branch that transmits the impulse to stimulate the basic cell 11, which is, therefore, designated as a stimulus cell. In operation, each synapse provides a delay from a feeder cell to the stimulus cell.

Accordingly, to simulate the actions of the synapses, the inputs from the feeder cells are applied to the tapped delay lines TDL1 through TDLn for "n" feeder inputs 1 through "n", where "n" represents the number of feeder inputs being applied to the basic stimulus cell 11. During the time-step simulation of the invention, the stimulus cell 11 sums the delay line outputs, as indicated by the conventional summation symbol 12 (sigma). The summation signal 12, shown mathematically in equation (3) of FIG. 6A, represents the stimulus of the cell 11.

Figure 2:
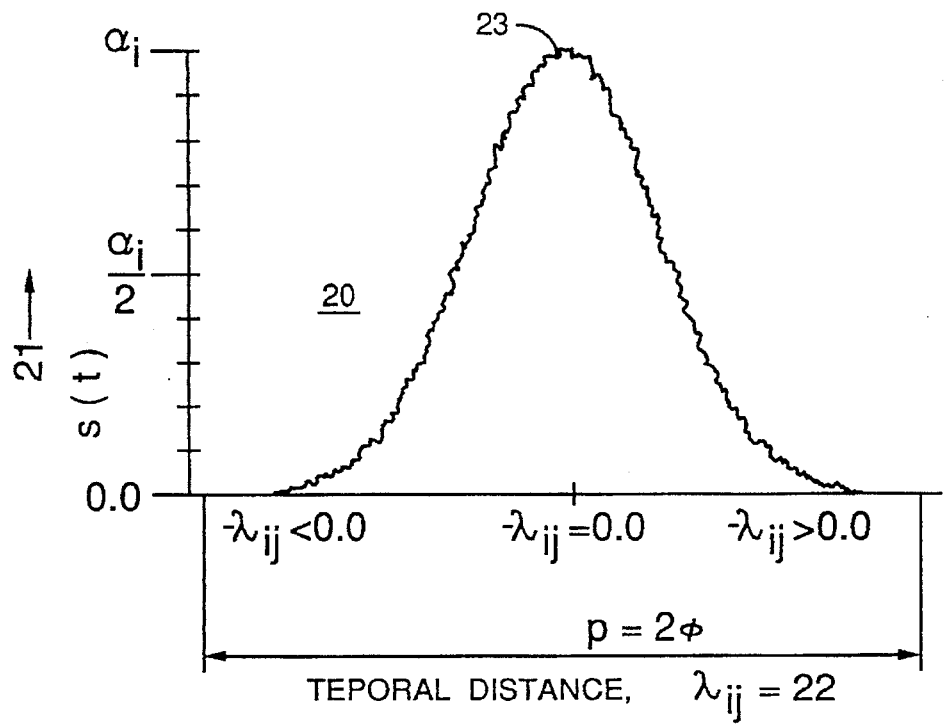
FIG. 2 is a diagram of a representative pulse used in the stimulus network of FIG. 1A.

The pulses of the inputs 1 through n used in the network 10 are represented by the pulse 20 of FIG. 2. The pulse 20 is selected for its spreading characteristics, as well as its ease of generation and manipulation. The mathematical relationships applicable to the pulse 20 of FIG. 2 are given in equations (1) and (1a) of FIG. 6A.

In FIG. 2, the pulse 20 is described by its amplitude 21 (alpha) and the temporal distance 22 (lambda) between the peak 23 of the pulse 20 and the center of the stimulus cell 11. The center of the stimulus pulse is the position on the synapse where the peak of the stimulation generated by the pulse exists. The values t and $t_i$ represent the current simulation time and the time the feeder cell, i, generated the pulse respectively. The value, $D(elta)_{ij}$, is the delay from the feeder cell i to the stimulus cell 11, designated generally as j.

This delay is controlled by the stimulus cell j and is the primary method of encoding information in the network. The width of the pulse is dependent on the width (2phi) p of the pulse time window and the pulse width modifier (gamma) γ. These parameters control generalization within the network 10. A larger width will generate a wider pulse and a greater generalization within the network.

Figure 3:
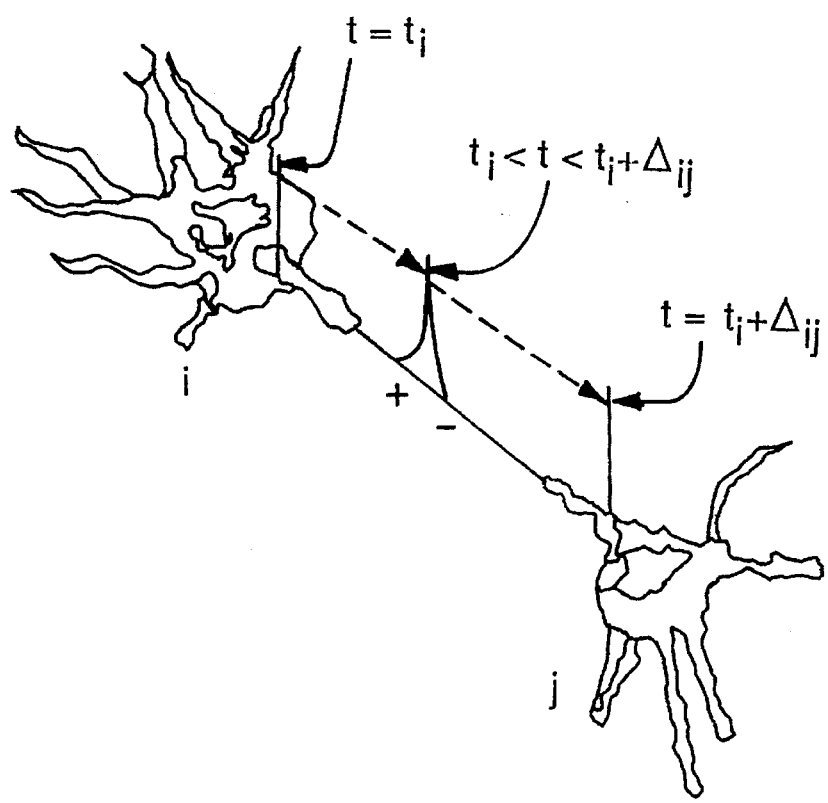
FIG. 3 is a diagram illustrating the travel of a pulse from a feeder cell to a stimulus cell in the stimulus network of FIG. 1A.

FIG. 3 illustrates a pulse traveling from a feeder cell to a stimulus cell. The pulse is traveling from cell i to cell j. At a time $t_i$ the pulse leaves cell i. At time $t_i+D(elta)_{ij}$ the pulse arrives at cell j. Arrival time of a pulse at a cell is defined as the instant the peak stimulation generated by the pulse is felt by the stimulus cell. In FIG. 3, the pulse will stimulate cell j before it arrives. Because the firing time of the feeder cell is at the peak of the pulse, the choice of pulse shape has some non-causal effects, i.e., the pulse will stimulate cell j before it arrives. this indicates that the pulse shape produces some non-causal effects (i.e., the pulse in FIG. 3 stimulates the synapse before neuron i fires). This can be avoided by the selection of a different pulse shape or by shifting the pulse. However, for simplicity, the pulse shape of FIG. 2 can be used.

It is possible for a feeder cell i to generate more than one pulse during processing of a single temporal pattern. An example is multiple firings of a single input cell i due to external stimulus. In this situation there is an aggregate stimulation generated by a feeder cell which is a summation of the stimulation caused by all pulses generated by the feeder cell i which has fired before and including time t.

II. Stimulus Cell Reaction

Figure 1B:
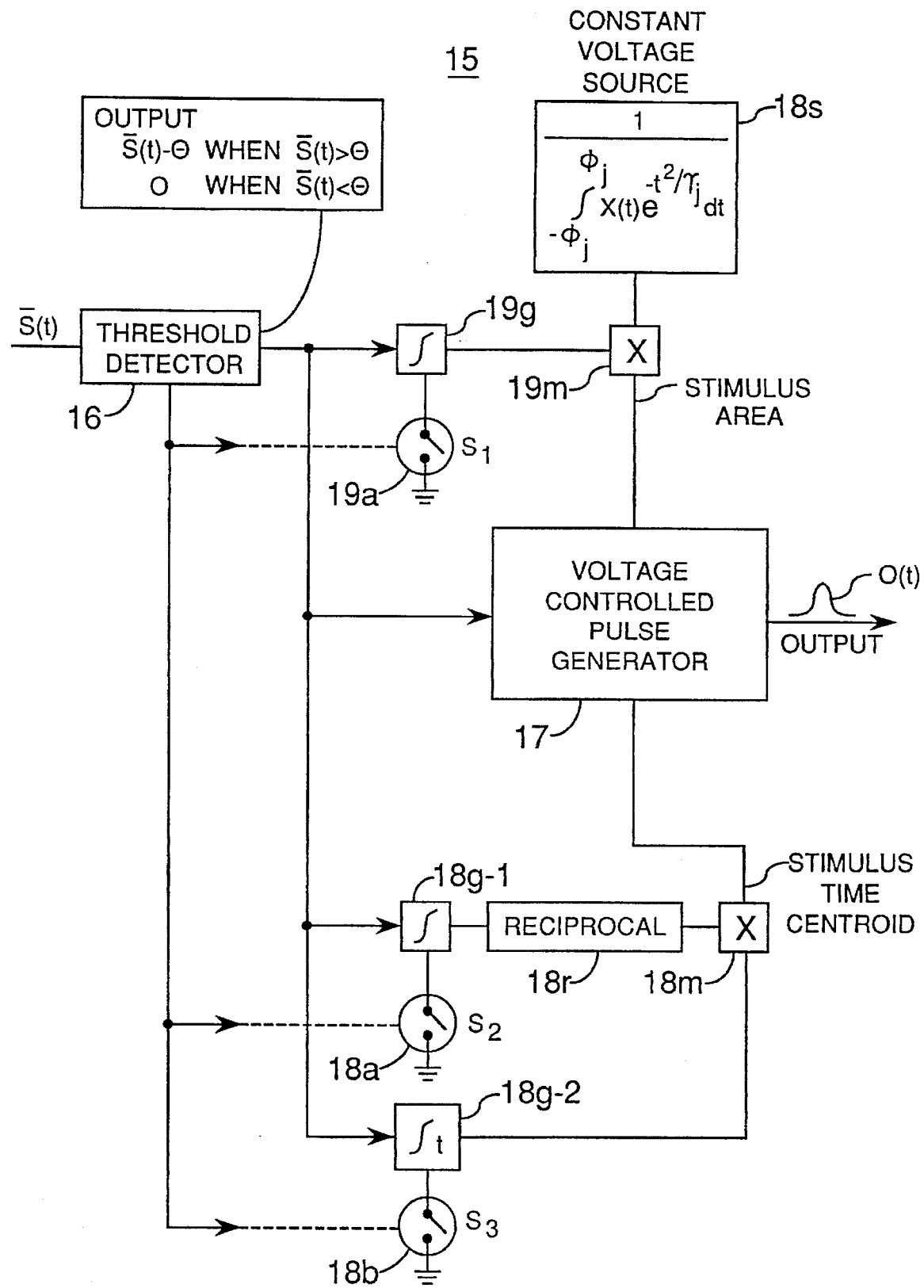
FIG. 1B is a stimulation reaction network for the basic or stimulus cell of FIG. 1A.

As illustrated in the reaction network 15 of FIG. 1B, the summation output from the stimulus network 10 of FIG. 1 is then thresholded. The aggregate stimulation generated by a single feeder cell is represented by equation (2) of FIG. 6A and the total stimulation from all feeder cells is given by equation (3) of FIG. 6A. If the total stimulation is great enough, an output pulse P is generated.

A stimulus cell j, such as the cell 11, reacts to its total stimulation by thresholding in order to decide whether or not to fire. The thresholding is of an instantaneous stimulation given by a summation. The summation is the stimulus applied to the cell due to n feeder cells. The value O(t) is the output of the cell from the voltage-controlled pulse generator 17 of FIG. 1B, and is given by equation (6a) of FIG. 6B. This output may be transformed to a stimulation for a cell k (not shown) as cell j becomes a feeder cell for cell k. The stimulus that cell j generates as a feeder to cell k is given by equation (6b) of FIG. 6B.

However, to arrive at the output O(t), the summation S(t) is applied to the threshold detector 16 in the simulated stimulus network 15 of FIG. 1B. The threshold value can be a variable, as represented by O (Omega) in equations (5) and (6) of FIG. 6B. The threshold is some fraction (i.e., 0.85, 0.75, 0.95, etc.) of the maximum previous stimulus seen by the cell. Because the network is using pulses to transmit information, a conversion must be made. The summation maybe in any form for the pulse shape given by FIG. 2. There are two values which must be found for the pulse generated: these are the firing time $t_j$, and the amplitude (alpha$_j$) of the pulse.

The firing time is the stimulus time centroid given by equation (5) of FIG. 6B and is represented in FIG. 1B by the following components: integrator 18g-1 whose output is reciprocated in the unit 18r and multiplied in a multiplier 18m by the integral over time in an integrator 18g-2 (represented by the numerator of equation (5)).

Similarly, the amplitude is the stimulus area given by equation (6) of FIG. 6B and is represented in FIG. 1B by the integrator 19g whose output is multiplied in a multiplier 19m by a constant voltage corresponding to the reciprocal of the area under a modified unit pulse (represented by the denominator of equation (6)). In order to clear the integrators 19g, 18g-1 and 18g-2 following the cut-off of the threshold detector following the processing of each input summation, the detector 16 acts to close the switches S1 through S3 to clear the integrators.

The conversion which has been selected is to transmit the same power found in the stimulus summation with the pulse. The firing time of a neuron for a particular stimulus which exceeds the threshold from time $t_+$ to time $t_-$ is the time half the power exceeding the threshold from the stimulus has flowed through the neuron. The amplitude of the pulse may be found from evaluating the threshold T forcing the pulse generated by the cell to deliver the same amount of power which the cell received from the stimulus summation over the time interval $t_+$ to $t_-$. Furthermore, this power is generated by the cell in a time window which gauges the concentration of the pulse power. With equal power transfer through a neuron, a large concentration will generate a low amplitude pulse while a small concentration will generate a higher amplitude pulse.

III. Delay Adaptation

Figure 4:
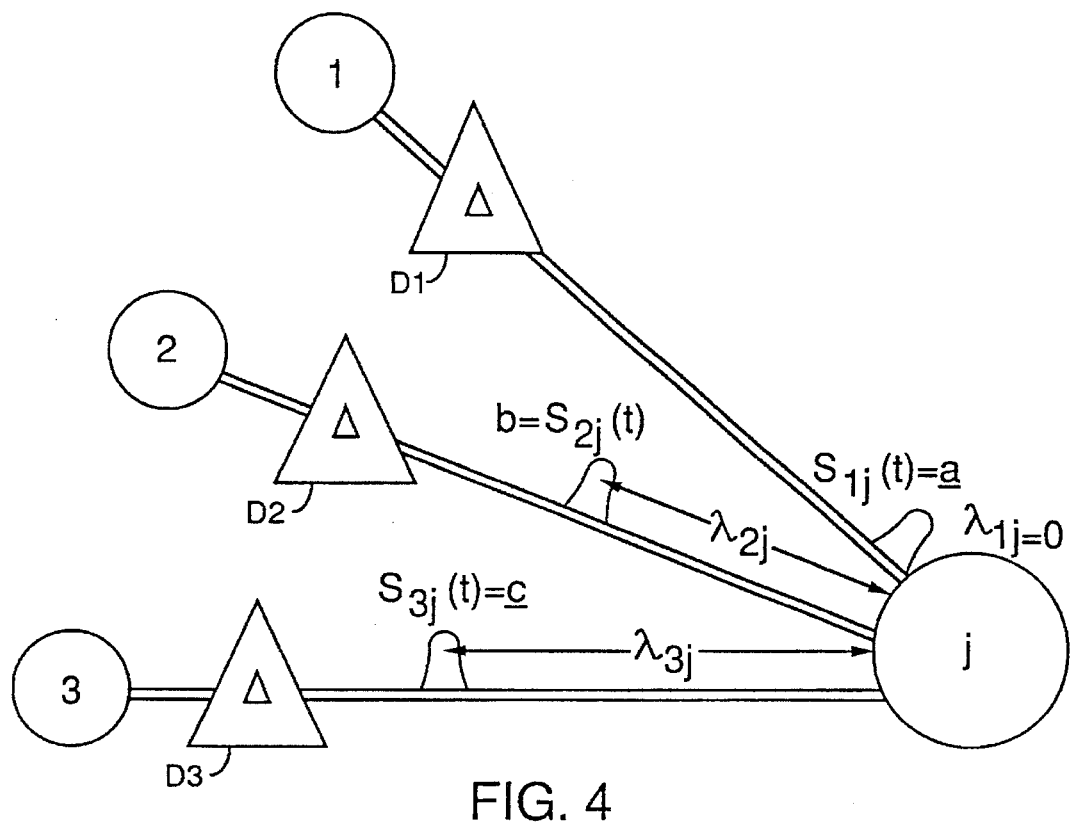
FIG. 4 illustrates pulses traveling from different feeder cells along respective synapses to a stimulus cell.

The foregoing discussion is of the interaction between cells within a neural network and the cellular reaction to stimulus. The synapse delays between the cells can be adapted to attain learning and long term memory within the neural network. The synapse delays are the primary memory within the neural network. Synapse delay lengths are controlled by the stimulus cell neuron to which they input. The update of a synapse delay occurs when a pulse arrives at the stimulus cell body from a feeder cell. This occurs when the temporal distance for a pulse is zero. FIG. 4 illustrates pulses a, b and c traveling down synapses D1, D2 and D3 respectively. The pulses are described by FIG. 2, and each has its own amplitude and firing time. FIG. 4 illustrates the instant pulse a arrives at the cell body, pulses b and c have been transmitted by feeder cells before a arrived at the cell body, j, but have not yet arrived. The arrival of a causes an adjustment of synapses D2 and D3 so that the next time a temporal stimulus appears on D1, D2 and D3, similar to the stimulus which generated a, b and c, the pulses will arrive closer together so that the temporal distance and amplitude are smaller when a arrives. This adjustment represents a contraction of D2 and D3, which shorten in length effectively decreasing their associated delays. D1 is an arrival synapse because there is a pulse arriving on it. Synapses D2 and D3 are pending synapses because there are pulses traveling on them when a arrives.

The delays are adjusted based on the temporal distances of pulses on pending synapses when a pulse arrives at a stimulus cell. There are several restrictions on a function relating the adjustment of a delay and the temporal distance.

The first of these restrictions is convergence. The function must generate a change in delay which causes the error in the delays to decrease. The function describing the adjustment of a delay is given by equation (7a) of FIG. 6B.

The selection of the sign on the adjustment of delay is related to the derivative of the stimulation generated at a point on a synapse as a pulse travels from a feeder cell to a stimulus cell. Equation (7a) and the restriction of convergence requires that a negative value of temporal distance representing a delay which is too long, generates a positive change in delay.

The second restriction is causality. A multi-temporal time delay must remain causal; this requires that the delays be positive. This requirement generates a modification of equation (7a) given by equation (7b) of FIG. 6B to include the restriction that a change in error delay is less than the change in delay.

Because the multi-temporal time delay neural network is causal if there is an observable pulse traveling down one of the pending synapses, the associated delay for that synapse is greater than the temporal distance for that pulse. A further consideration is that the charge in delay is a function of temporal distance on the generation of change in delay, so the system will remain causal. The function selected is given by equation (9) of FIG. 6C which is used to determine the delay adjustment, based on the temporal distance, of a pulse from the stimulus cell body.

IV. Threshold Adaptation

The value of the threshold is percentage of the maximum stimulation felt by the stimulus cell. Rather than having the cell adjust the threshold level instantaneously to a given percentage of maximum stimulation, the threshold is adjusted a small amount toward the final threshold each time a neuron fires. For threshold adjustment equation (10) of FIG. 6C applies. The value of omega is the incremental percentage of adjustment toward the goal threshold as defined by the maximum value of the summation and the percentage of Omega in equation 10. Consequently, the adjustment of the threshold is applied each time the neuron fires and is given by equation (11). Equations (11) and (7a) define the entire learning process performed by the individual cells in a multi-temporal trainable delay neural network.

V. Learning Within a Network

In a method of using a multi-temporal trainable delay neural network for temporal pattern classification, a simple input of temporal stimulus on several input neurons is used to train output neurons to classify that stimulus.

A simple stimulus is one which stimulates any combination of input neurons in any temporal sequence. The stimulus is qualified as simple by requiring that each neuron in an input layer may be stimulated, at most, one time in the sequence.

Figure 5:
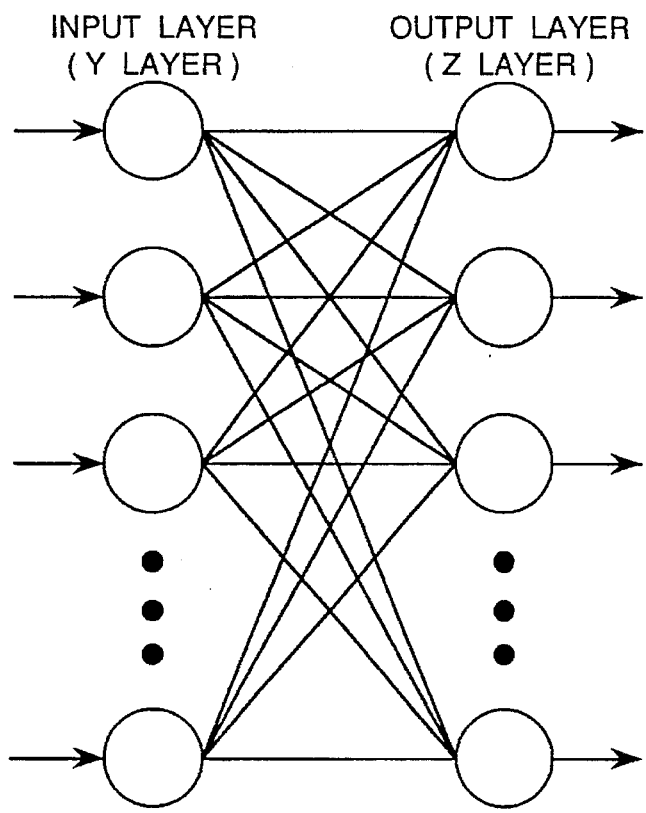
FIG. 5 is a diagram outlining a two-layer network in accordance with the invention.

The architecture of the network has two layers. These are the input layer, Y, and the output layer, Z. FIG. 5 illustrates this architecture. The Y layer cells are pulsed to generate input to the network and the Z layer cells adapt their synapse delays to learn the temporal patterns.

To train the network, input the simple temporal stimulus, propagate the pulses through the network, determine which Z layer cell had the largest stimulation and adapt the delays of that cell based on the equations (7a), (7b), (8) and (9) set forth in FIGS. 6B and 6C in relation to section IV, above.

A complex stimulus may be handled by a multi-temporal trainable delay neural network with more than two layers. A complex stimulus, one which stimulates a particular Y layer neuron more than once, may be broken into two or more simple stimuli. If the network trains on each of the simple stimulus patterns it will be able to classify them on the Z layer. If the complex stimulus is then presented to the Y layer a less complex temporal sequence will result as output from the Z layer. This less complex temporal pattern may then be input through synapses to a second Z layer which may in turn reduce the complexity of the temporal pattern.

The invention provides a model of the biological neuron based on temporal aspects. Rather than adapting common neural network paradigms to handle temporal sequences, the neuron simulation of the invention is better suited to temporal analysis, with methods of delay adaptation and temporal pattern classification. An illustrative Flow Chart for the practice of the invention is set forth in the attached Appendix, available in file wrapper, which is readily implemented using a computer, or a network of components which emulate the functions of the Flow Chart. Such a network is a multi-temporal time delay special purpose computer.

It will be appreciated that the foregoing description, and attached Appendix, available in file wrapper, are illustrative only, and that other modifications and adaptations of the invention will be apparent to those of ordinary skill in the art. The invention is further defined by the claims which appear below after the Flow Chart of the Appendix, available in file wrapper.

What is claimed:

1. The method of simulating a neural network containing feeder and stimulus cells, said method comprising the use of delays in place of amplifications to directly encode temporal relationships among said feeder and stimulus cells, whereby said neural network becomes a multi-temporal time delay neural network.

2. The method as defined in claim 1 wherein said delays are implemented by memory usage which reduces the required size of the neural simulation network in place of amplification weight procedures.

3. The method as defined in claim 1 which comprises using intercellular multi-temporal trainable delays, which vary throughout the network, and adapting neural synapse delays usable for temporal pattern recognition based on temporal stimuli.

4. The method of claim 1 for simulating the responses of neural-like synapses which comprises the steps of:

(a) Initializing a network of simulated neurons containing variable time delays and fire-time memories by setting all delays to unity and clearing all neuron fire time memories;
   (b) Inputting temporal stimuli by setting said fire-time memories of input neurons to the times they will next fire;
   (c) Initializing time as the earliest pulse time minus a prescribed pulse time width;
   (d) Normalizing said network by normalizing sets of delays for each neuron;
   (e) Initializing indexes and sums for said feeder and stimulus cells;
   (f) Setting a summation of feeder pulses plus a stimulus from a prescribed pulse; and
   (g) Determining if said prescribed pulse has arrived at a stimulus neuron.

5. The method of claim 4 for simulating the responses of neural-like synapses; wherein said fire-time memories of input neurons are set to the times they will next fire due to the input stimulus of a next training data point, time (t) is initialized as said earliest pulse time minus said prescribed pulse time width, said indexes and sums are initialized as stimulus pulse j=0, summation $S_j(t)=0$, feeder pulse i=0, $S_i(t)=0$, said prescribed pulse C=0 for indexing through pulses from feeder pulse i, and $S_j(t)$ is set =$S_j(t)$+stimulus from pulse C.

6. The method as defined in claim 4 wherein if said prescribed pulse has arrived at a stimulus neuron, delays are adapted for said stimulus neuron, but if said prescribed pulse has not arrived at said stimulus neuron, go to claim 7.

7. The method as defined in claim 6 further including the steps of incrementing pulse C=C+1, i=i+1 and j=j+1, and setting C=$PC_i$, i=$n_j$ and j=m; determine and update fire times; determine if there are still pending synapses, and if so, augment t=t+D(elta)t and return to step (d) of claim 4.

8. The method as defined in claim 6 wherein if C does not equal the total number of pulses from the ith neuron, return to step (f) of claim 4, and if C equals the total number of pulses from the ith neuron, augment i to i=1 and if i=$n_j$ is false then go to summation $S_i(t)=0$ in step (e) of claim 4.

9. The method as defined in claim 6 wherein if i=$n_j$, augment j to j+1 and then if j=m, determine and update fire times, and if there are still pending synapses, augment t=t+Dt and go to step (d) of claim 4.

10. The method as defined in claim 9 wherein if there are no pending synapses, adapt thresholds and clear all neuron fire time memories and go to the input step (b) of claim 4.

11. A neural simulation network comprising
   a basic stimulus cell receiving inputs from feeder cells;
   a plurality of synapses simulated by delay lines connected to said basic cell, each synapse representing the position at which a nerve impulse from a feeder neuron is transmitted to stimulate said basic cell;
   means in said basic cell for summing the outputs of said delay lines;
   wherein said inputs are pulses selected for their spreading characteristics, as well as ease of generation and manipulation and are described by their amplitudes and their temporal distances between pulse peaks and the center of said basic cell.

12. A neural simulation network as defined in claim 11 comprising
   (a) means for initializing a network of simulated neurons containing variable time delays and fire-time memories by setting all delays to unity and clearing all neuron fire time memories;
   (b) means for inputting temporal stimuli by setting said fire-time memories of input neurons Go the times they will next fire;
   (c) means for initializing time as the earliest pulse time minus a prescribed pulse time width;
   (d) means for normalizing said network by normalizing sets of delays for each neuron;
   (e) means of initializing indexes and sums for said feeder and stimulus cells;
   (f) means for setting a summation of feeder pulses plus a stimulus from a prescribed pulse; and
   (g) means for determining if said prescribed pulse has arrived at a stimulus neuron.

13. A neural simulation network as defined in claim 11 wherein a pulse travels from a feeder cell i to a basic or stimulus cell j, with said pulse leaving cell i at a time $t_i$ and arriving at time $t_i$+D(elta)$_{ij}$ at cell j from a synapse, comprising means for providing the arrival when peak stimulation generated by said pulse is sensed by said stimulus cell.

14. A neural simulation network as defined in claim 13 comprising means for compensating for non-causal effects resulting from the stimulation of a synapse before a neuron cell fires, comprising means for modifying pulse shape or shifting said pulse.

15. A neural simulation network as defined in claim 13 comprising a feeder cell generating a plurality of pulses during processing of a single temporal pattern; whereby an aggregate stimulation generated by a feeder cell is a summation of the stimulation caused by all pulses generated by said feeder cell.

16. A neural simulation network as defined in claim 13 wherein said summation is thresholded and an output pulse is generated, when the total stimulation is great enough to exceed the threshold, from a voltage-controlled pulse generator which fires in response to a stimulus time centroid and a stimulus area amplitude; said thresholding is of an instantaneous stimulation given by said summation.

17. A neural simulation network as defined in claim 16 wherein said stimulus time centroid is produced by an integrator whose output is reciprocated and multiplied by a time integral; and said stimulus area amplitude is produced by integrator whose output is multiplied by a constant voltage corresponding to the reciprocal of the area under a modified unit pulse.

18. A neural simulation network as defined in claim 16 wherein the value of said threshold is a percentage of the maximum stimulation felt by the stimulus cell; said threshold is adjusted a small amount toward the final threshold each time a neuron fires; whereby a learning process is performed by individual cells in a multi-temporal trainable delay neural network.

19. A neural simulation network as defined in claim 11 wherein the synapse delays between the cells are adapted to attain learning and long term memory within the neural network, comprising synapses having delay lengths controlled by a stimulus cell neuron to which they input, with each synapse delay being updated when a pulse arrives at said stimulus cell from a feeder cell when the temporal distance for a pulse is zero, with each arrival causing an adjustment of other synapses so that the next time a temporal stimulus similar to the one which generated prior pulses appears on said synapses, the pulses will arrive closer together and the temporal distance and amplitude are smaller when said pulse arrives, representing a contraction which shortens in length effectively decreasing associated delays; said delays are adjusted based on the temporal distances of pulses on pending synapses When a pulse arrives at a stimulus cell, subject to convergence by which a change in delay causes error in the delays to decrease and causality which requires that the delays be positive.

20. A neural simulation network as defined in claim 11 which is multi-temporal trainable, comprising a plurality of layers, such as an input layer and an output layer; wherein one layer is pulsed to generate an input to said network and the cells of another layer adapt their synapse delays to acquire temporal patterns; whereby for a simple temporal stimulus inputted in training said network pulses are propagated through said network and a determination made of which other layer cells had the largest stimulation, and the delays of those cells are adapted, and, for a complex stimulus, which stimulates a particular layer neuron more than once, and may be broken into two or more simple stimuli, said network may have more than two layers; whereby if said network trains on each simple stimulus patterns it will be able to classify them on an output layer, and if a complex stimulus is then presented to an input layer a less complex temporal sequence will result on an output layer, which may, in turn, be an input through synapses to a further layer and reduce the complexity of the temporal pattern.

* * * * *